Oct. 18, 1966   F. CHRIST   3,278,962
WASHING DEVICE FOR PASSENGER CARS
Filed Aug. 4, 1964   3 Sheets-Sheet 1

Oct. 18, 1966  F. CHRIST  3,278,962
WASHING DEVICE FOR PASSENGER CARS
Filed Aug. 4, 1964  3 Sheets-Sheet 3

United States Patent Office 3,278,962
Patented Oct. 18, 1966

3,278,962
WASHING DEVICE FOR PASSENGER CARS
Franz Christ, Dickenreiserweg 15, Menningen,
Bavaria, Germany
Filed Aug. 4, 1964, Ser. No. 387,394
Claims priority, application Germany, June 18, 1964,
C 33,173
5 Claims. (Cl. 15—21)

The present invention relates to a washing device for passenger cars which is displaceable relative to the vehicle.

It is the purpose of the invention to provide a washing device for passenger cars which is particularly suitable to be incorporated into available vehicle washing rooms. For this purpose it is necessary that, on the one hand, all the elements necessary for the washing device are united with each other constructionally and that, on the other hand, the outer dimensions are kept as small as possible.

According to the invention the proposal is made that a portal or arch shaped frame shiftable over the vehicle is provided, on which three rotating brushes are mounted, the rotation axes of each of which are carried by two swinging arms each with swinging axes parallel to the rotational axes, whereby two brushes, essentially engaging the two lateral surfaces of the vehicle have vertical rotation axes, while the third brush has a horizontal rotational axis and engages essentially the upper side of the vehicle, that the distance between the swinging arms carrying the brush with the horizontal rotation axis is essentially greater than the length of this brush and that the brushes with the vertical rotation axis can be shifted into the space between the ends of the brush with the horizontal rotation axis and its swinging arms.

By mounting the brushes on swinging arms the invention provides in a simple manner the necessary adaptability of the washing device to the different dimensions of the vehicles to be washed. By the specific arrangement according to the invention the mutual distance of the rotation axes of the brushes may be kept very small, whereby the outer dimensions of the washing device remain likewise small.

The drawings show a preferred embodiment of the washing device according to the invention.

Figure 1:
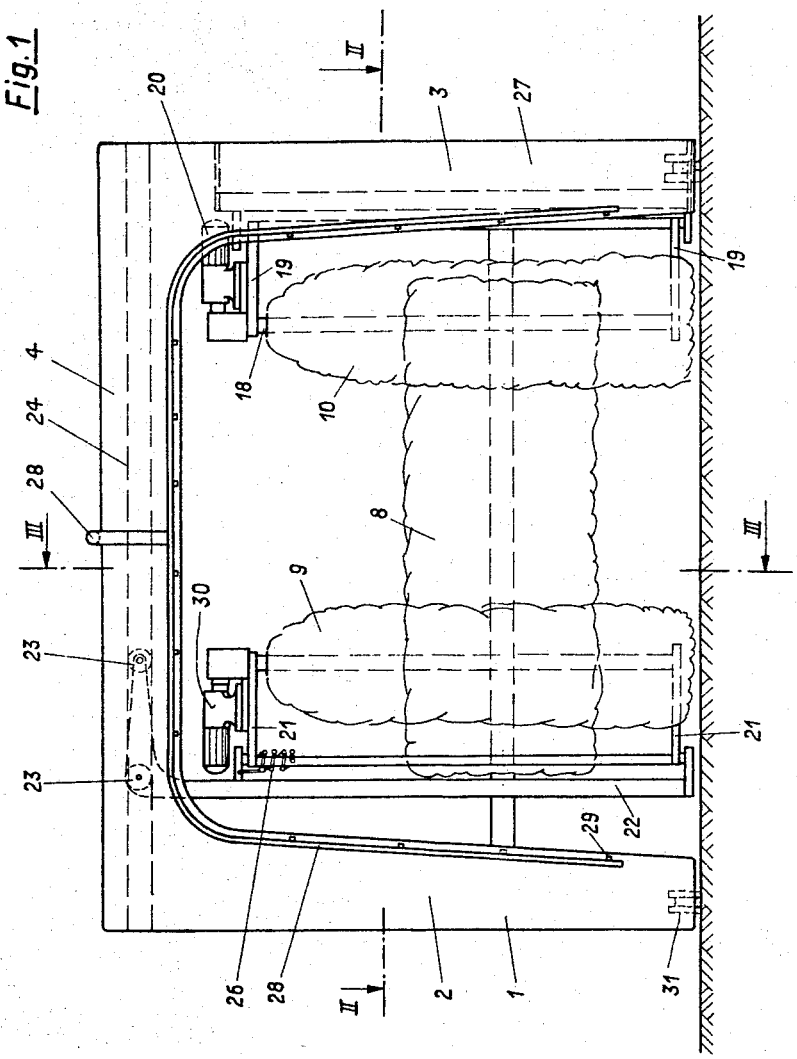
FIG. 1 is a front elevation of the washing device.
Figure 2:
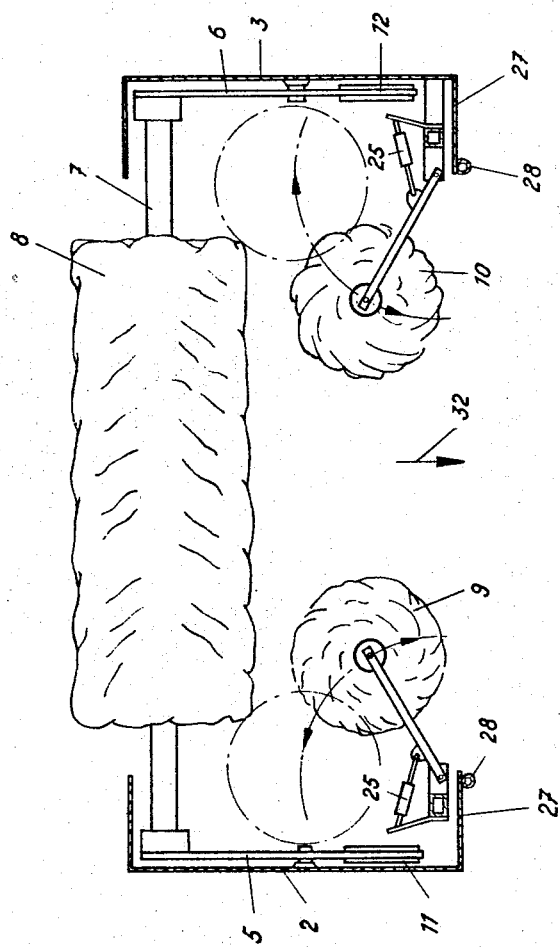
FIG. 2 is a horizontal section through the embodiment according to FIG. 1 along the line II—II and FIG. 3 shows a vertical section through the embodiment according to FIG. 1 corresponding to the section line III—III.
Figure 3:
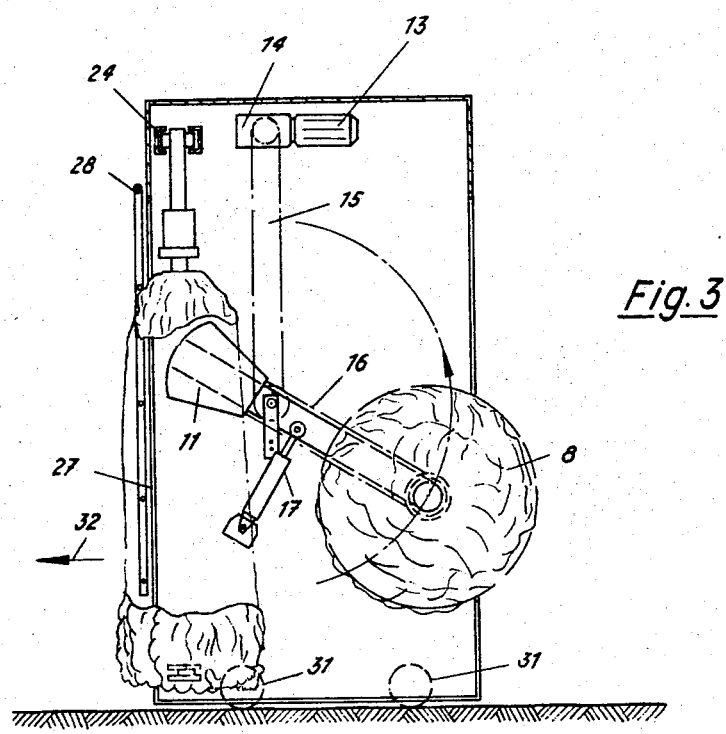

The frame of the device has a portal or arch shaped configuration. It consists of the upright lateral or side parts 2 and 3 and the upper connecting cross part 4. FIGURES 2 and 3 show that the parts 2, 3, and 4 each have a channel-shaped profile.

An arm 5 is mounted for swinging or pivotal movement about a horizontal axis on the side part 2 and a similar arm 6 is mounted for swinging or pivotal movement about a horizontal axis on the side part 3. A shaft 7 is carried by the arms 5 and 6 and serves to mount a rotatable brush 8. The brush 8 consists of a brush body having relatively long bristles and as clearly shown in FIG. 2, the brush 8 is substantially shorter than the distance between the arms 5 and 6.

The swing arms 5 and 6 are provided with counterweights 11 and 12 partially compensating for the weight of the brush 8. The brush 8 is driven by a motor 13 through a gear mechanism 14 and chains 15 and 16. By means of a cylinder-piston arrangement 17 operated by compressed air the brush 8 can be raised or lowered about the horizontal pivotal mounting of the arms 5 and 6.

The shaft 18 of the brush 10 is carried by swing arms 19 pivotally mounted on the side part 3 for movement about a vertical axis. The motor 20 serves to drive the brush 10. The swing arms 21 supporting the brush 9 are pivotally mounted for movement about a vertical axis on a frame 22 having rollers 23 on its upper extremity, which rollers are displaceable in a rail 24 carried by the upper cross part 4. In this manner the brush 9 may be moved in a direction towards the brush 10. Swinging movement of the brush 9 as well as the brush 10 is controlled by cylinder-piston arrangements 25 and a pair of springs 26 serve to urge or bias the brushes laterally against the vehicle to be cleaned.

The mode of operation of the washing device according to the invention is as follows:

The vehicle to be cleaned stands at the beginning of the washing process with its front end in line with the front walls 27 of the lateral side parts 3 and 2 respectively. Through the piping 28 the vehicle is sprayed with water by means of the nozzles 29. If desired a detergent may be added to the washing water. The detergent may, however, also be applied by special nozzles which are not represented in detail. The drive motor 30 of the brush 9 is switched on and a suitable drive motor, not shown, for shifting the frame 22 along the rail 24 is energized. As a result the brush 9 moves across the front of the vehicle to clean the same. In this part of the cleaning process the cylinder-piston arrangement 25 of the brush 10 moves the brush 10 to the position shown in FIGURE 2 in dot-and-dash lines so that the brushes 9 and 10 do not come into contact with each other. At the end of the rail 24 the drive motor for the frame 22 is reversed and the brush 9 returns to its initial position. The cylinder-piston arrangement 25 of the brush 10 is vented to return the brush 10 to the full line position of FIG. 2 and both brushes 9 and 10 engage the sides of the vehicle under the effect of the springs 26.

Now the drive motor (not shown in detail) of the frame 1 is switched on and the frame 1 advances by means of rollers 31 on rails fixed in the floor in the direction of the arrows 32 along the vehicle. During this movement the motors 20 and 30 for the brushes 10 and 9 as well as the motor 13 for the brush 8 are switched on. The brushes 9 and 10 clean the lateral side surfaces and the brush 8 cleans the surfaces directed upward including the windscreen.

As soon as one of the brushes 9 or 10 loses contact with the vehicle and thus pivots under the effect of the springs 26 further in the direction of the arrow 32, the drive motor of the frame 1 is switched off and the brush 9 cleans the rear part of the vehicle in the same manner as in the above-described cleaning process for the front with the brush 10 moving to the dot-dash line position of FIG. 2.

At the end of this process the drive motor of the frame 1 is reversed and the frame 1 moves back into its initial position. During this movement the cylinder-piston arrangements 25 are actuated to move the brushes toward the dot-dash line position of FIG. 2 partially into the frame 1. By admission of compressed air to the cylinder-piston arrangement 17 the brush 8 may be lifted away from the vehicle. If desired during the return movement of the frame a further cleaning process may be carried out, preferably with a reversed rotation of the brushes.

The above-described operations may be carried out automatically under the influence of a suitable follow-up control. A hand-control of the process is possible, but not necessary.

I claim:

1. A washing apparatus for vehicles, said apparatus comprising an arch shaped frame, wheels mounting said frame for movement longitudinally of said vehicle, drive means for moving said frame, a pair of spaced arms pivotally mounted on opposite sides of said frame for movement about a horizontal axis, a horizontal brush carried by said arm for rotation about a horizontal axis, the length of said brush being substantially less than the distance between the sides of said frame, means for driving said brush, a pair of vertically spaced arms pivotally mounted on one side of said frame for movement about a vertical axis, a vertical brush carried by said last named arm for rotation about a vertical axis, means to drive said vertical brush, resilient means for biasing said vertical brush away from the adjacent side of said frame, power means for moving said vertical brush to a position between one end of said horizontal brush and the adjacent side of said frame, a horizontal track mounted on the upper portion and extending between opposite sides of said frame, a depending frame carried by said track for movement thereon transversely of said vehicle, drive means for moving said depending frame toward and away from said vertical brush, a second pair of vertically spaced arms pivotally mounted on said depending frame for movement about a vertical axis, a second vertical brush carried by said last named arms for rotation about a vertical axis, means to drive said second vertical brush, resilient means for biasing said second vertical brush toward said first vertical brush, and power means for moving said second vertical brush to a position between the opposite end of said horizontal brush and the adjacent side of said arch shaped frame.

2. A washing apparatus for vehicles as defined in claim 1 in which power means is provided for raising and lowering said horizontal brush about the pivotal axis of said first mentioned arms.

3. A washing apparatus for vehicle as defined in claim 2 in which said power means comprises a cylinder and piston.

4. A washing apparatus for vehicles as defined in claim 1 in which the power means for moving the vertical brush comprises a cylinder and piston.

5. A washing apparatus for vehicles, said apparatus comprising an arch shaped frame, wheels mounting said frame for movement longitudinally of said vehicle, drive means for moving said frame, a pair of spaced arms pivotally mounted on opposite sides of said frame for movement about a horizontal axis, a horizontal brush carried by said arm for rotation about a horizontal axis, means for driving said brush, a pair of vertically spaced arms pivotally mounted on one side of said frame for movement about a vertical axis, a vertical brush carried by said last named arms for rotation about a vertical axis, means to drive said vertical brush, means for biasing said vertical brush away from the adjacent side of said frame, power means for moving said vertical brush toward the adjacent side of said frame, a horizontal track mounted on the upper portion and extending between opposite sides of said frame, a depending frame carried by said track for movement thereon transversely of said vehicle, drive means for moving said depending frame toward and away from said vertical brush, a second pair of vertically spaced arms pivotally mounted on said depending frame for movement about a vertical axis, a second vertical brush carried by said last named arms for rotation about a vertical axis, means to drive said vertical brush, means for biasing said second vertical brush toward said first vertical brush, and power means for moving said second vertical brush toward the adjacent side of said arch shaped frame.

References Cited by the Examiner

UNITED STATES PATENTS

| 2,579,866 | 12/1951 | Rousseau | 15—21 |
| 3,035,293 | 5/1962 | Larson | 15—21 |
| 3,090,981 | 5/1963 | Vani et al. | 15—21 |

FOREIGN PATENTS

| 544,132 | 7/1957 | Canada. |
| 1,236,015 | 6/1960 | France. |

CHARLES A. WILLMUTH, *Primary Examiner.*

EDWARD L. ROBERTS, *Assistant Examiner.*